(12) United States Patent
Yang

(10) Patent No.: US 6,765,789 B2
(45) Date of Patent: Jul. 20, 2004

(54) PERSONAL DIGITAL ASSISTANT EXPANSION MODULE

(75) Inventor: Yu-Chun Yang, Taipei Shien (TW)

(73) Assignee: Quanta Computer Inc., Taoyuan Shien (TW)

( * ) Notice: Subject to any disclaimer, the term of this patent is extended or adjusted under 35 U.S.C. 154(b) by 0 days.

(21) Appl. No.: 10/389,970

(22) Filed: Mar. 18, 2003

(65) Prior Publication Data

US 2004/0105221 A1 Jun. 3, 2004

(30) Foreign Application Priority Data

Dec. 3, 2002 (TW) .......................... 91135105 A

(51) Int. Cl.[7] ................................................ G06F 1/16
(52) U.S. Cl. .................... 361/681; 361/818; 710/102; 248/922
(58) Field of Search ................ 361/679–687, 361/724–727, 818; 607/60; 710/102; 700/91; 248/918–922; 364/708.1

(56) References Cited

U.S. PATENT DOCUMENTS 6,256,193 B1 * 7/2001 Janik et al. .................. 361/683
6,421,232 B2 * 7/2002 Sallam ........................ 361/681
6,519,144 B1 * 2/2003 Henrie et al. ............... 361/686

* cited by examiner

Primary Examiner—Hung Van Duong
(74) Attorney, Agent, or Firm—Rabin & Berdo, P.C.

(57) ABSTRACT

An expansion module of a personal digital assistant is described. The expansion module provides an easy expansion environment and interface for the personal digital assistant. The expansion module has a connecting interface, a network device, a storage device, a power module, and an input/output interface. The connecting interface transmits information between the personal digital assistant and the expansion module. The network device provides a network connecting environment. The storage device provides a larger storage capacity for the personal digital assistant. The power cord provides an external power source and recharge function. The input/output interface connects more external devices. The expansion module further has a monitor, a keyboard, and a mouse so that the personal digital assistant inserted in the expansion module is like a personal computer. The expansion module further has a processor to control the expansion module and transform data to fit each input/output interface requirement.

20 Claims, 2 Drawing Sheets

PERSONAL DIGITAL ASSISTANT EXPANSION MODULE

FIELD OF THE INVENTION

The present invention relates to an expansion module and especially to an expansion module of a personal digital assistant (PDA).

BACKGROUND OF THE INVENTION

Due to improvement in the semiconductor manufacture process, the speed and function of a personal digital assistant microprocessor have become faster and more powerful. Therefore, the electric circuit layout of the microprocessor has become more complicated and more sophisticated. The current microprocessor speed of a new generation PDA is faster than 150 MHz, and the calculation ability thereof is growing with each passing day.

Generally, a nonprofessional user of a personal computer (PC) uses usually word processor application software, such as Windows Word, or a spreadsheet application software, such as Windows Excel, for working time. A current popular application software is an Internet browser, such as Windows Internet Explorer or Netscape Navigator, to provide user access to websites on the Internet. Now, a PDA can provide enough speed to work with the above application software for a nonprofessional computer user. In the future, a PDA will provide enough speed for not only a nonprofessional user but also for a professional user.

A PDA is compact in appearance and size so that the internal space of the PDA is insufficient for additional internal devices. Furthermore, the conventional input device of a PDA is a stylus or a screen keyboard, and therefore the input speed of the PDA is very slow.

As current PDAs are getting more powerful, a PDA can be a substitute for a personal computer when dealing with daily business in the futher. The internal space and internal devices, however, are still not sufficient for a normal daily business requirement now. Therefore, even though PDAs are very portable, the operation capabilities of PDAs still needs enhancement. Hence, there is a need to provide a convenient operation environment, at least like a personal computer working environment, and to enhance the operation ability of the PDA. The rate of use PDA can be increased, especially at home and office, if the PDA operation capability can be enhanced.

SUMMARY OF THE INVENTION

One object of the present invention is to provide an expansion module of a personal digital assistant that is convenient for input, output and operation at home and office.

Another object of the present invention is to provide an expansion module of a personal digital assistant to integrate efficiently and connect peripheral devices of the personal digital assistant, and therefore increase the expansion capacity of the personal digital assistant.

The present invention provides a personal digital assistant expansion module. The personal digital assistant expansion module comprises a connecting interface, a network connection device, a storage device, a power module, and other input/output interfaces. The connecting interface couples with a personal digital assistant for transmitting signals between the personal digital assistant expansion module and the personal digital assistant. The network connection device provides a network environment for the personal digital assistant and the expansion module. The storage device, such as a hard disc having a storage quantity larger than the storage quantity of the personal digital assistant, stores and provides data for the personal digital assistant.

The power module provides an external electrical power to the personal digital assistant expansion module and the personal digital assistant, and to recharge a battery of the personal digital assistant. The input/output interface connects with external devices for the personal digital assistant use. The input/output interface can connect with a monitor, a keyboard, a mouse, a hard disc, an optical disc drive, a plotter, a printer, or any external device used for a personal computer and the combination thereof.

The connecting interface further comprises a processor to transfer data specifications between the personal digital assistant expansion module and the personal digital assistant. The input/output interface comprises a universal serial bus (USB) interface, a personal system/2 (PS/2) interface, a bluetooth interface, an interface obeying IEEE 1394 specification, an interface obeying IEEE 802.11x specification, or an infrared (IR) interface.

Another aspect of the expansion module of the present invention further comprises a monitor, a keyboard, a mouse, and any external device used in a personal computer so as to provide a personal computer function by the expansion module inserted the personal digital assistant. Therefore, the expansion module and personal digital assistant provide a personal computer working capability to deal with daily business, and there is no need to buy a personal computer to deal with daily business.

Hence, the personal digital assistant expansion module according to the present invention enhances the operation ability and practicability of the personal digital assistant, and integrates the external devices of the personal digital assistant to reduce the requiring driver. Furthermore, the personal digital assistant expansion module according to the present invention reduces the input/output interface requirement burden of the personal digital assistant and provides a hot-swappable function so as to be used more widely.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
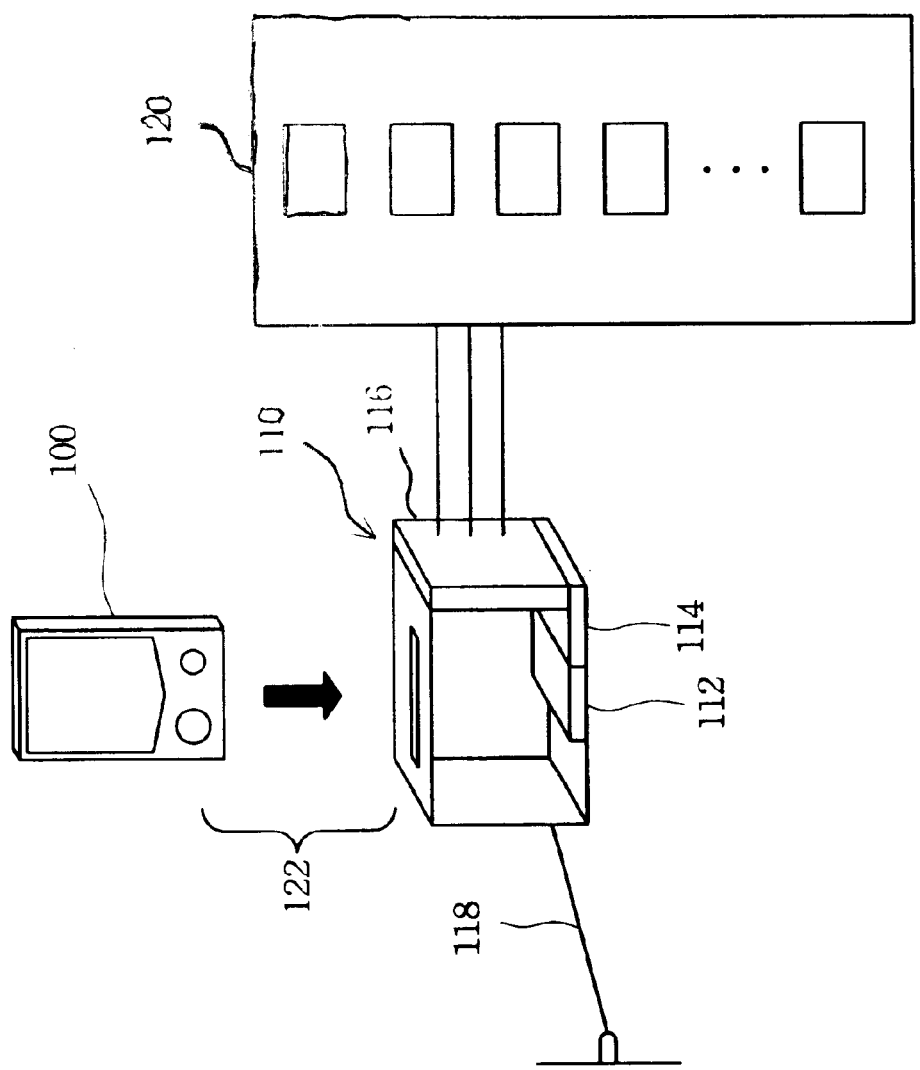
FIG. 1 is a schematic view of a preferred embodiment of an expansion module of a personal digital assistant according to the present invention.

FIG. 1 is a schematic view of a preferred embodiment of an expansion module of a personal digital assistant according to the present invention. The expansion module 110 includes a connecting interface 122, a storage device 112, a network connection device 114, an input/output interface 116, and a power module 118. The connecting interface 122 connects the expansion module 110 to the personal digital assistant 100. The power module 118 provides electrical power for the expansion module 110 and external electrical power for the personal digital assistant 100 when the personal digital assistant 100 is inserted into the expansion module 110. The input/output interface 116 provides expansion capacities of the expansion module 110 and the personal digital assistant 100. The input/output interface 116 connects with external devices 120, such as a monitor, a keyboard, a mouse, a hard disk, an optical disk drive, a printer, or any other external device of a personal computer.

The input/output interface 116 comprises a universal serial bus (USB), a personal system/2 (PS/2), an IEEE 1394, an IEEE 802.11x, a blue tooth, or an infrared (IR) interface. Accordingly, the expansion module 110 of the present invention can easily connect with external devices 120 which are compatible with these interfaces. The expansion capacity of the expansion module 110 of the present invention is further enhanced. Therefore, the personal digital assistant 100 can immediately use the network connection device 114 and the storage device 112 of the expansion module 110 when the personal digital assistant 100 inserted in the expansion module 110 of the present invention. In the meantime, the personal digital assistant 100 can use the external electrical power and recharge the battery thereof by way of external electrical power from the power cord 118 of the expansion module 110. The personal digital assistant 100 can further increase sorts and quantities of the compatible external devices 120 by way of the input/output interface 116 of the expansion module 110. Hence, the personal digital assistant 100 works more conveniently and practically.

Figure 2:
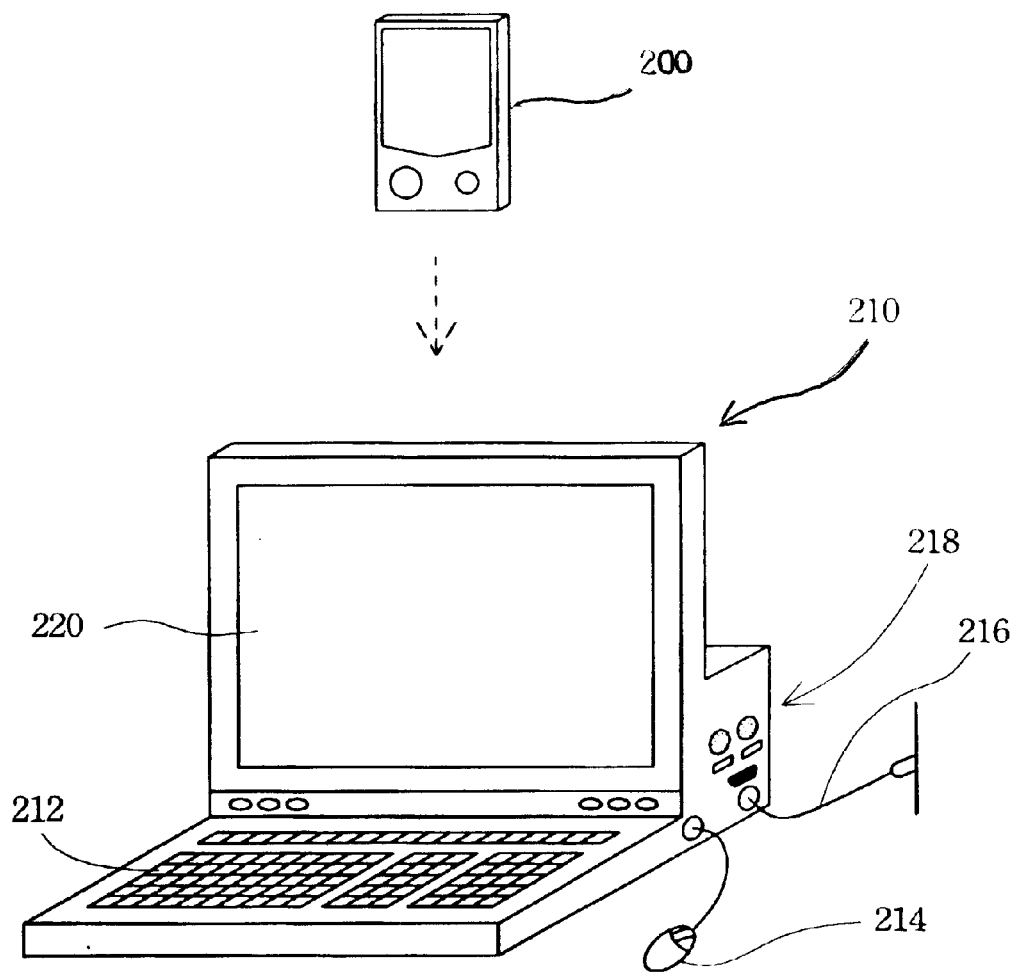
FIG. 2 is a schematic view of another preferred embodiment of an expansion module of a personal digital assistant according to the present invention.

FIG. 2 is a schematic view of another preferred embodiment of an expansion module of a personal digital assistant according to the present invention. The expansion module 210 of another preferred embodiment according to the present invention includes a monitor 220, keyboard 212, a mouse 214, a power module 216, and an input/output interface 218. The expansion module 210 is set at the rear surface of the monitor 220. The expansion module 210 of another preferred embodiment further includes an optical disc drive, a hard disk, a connecting interface at backside thereof (not shown). That is to say, the preferred embodiment further includes a standard external and internal device of a personal computer. Therefore, the personal digital assistant 200 provides a personal computer capability when the personal digital assistant 200 inserted into the expansion module 210 of the preferred embodiment according to the present invention. The user can use a normal keyboard 212, mouse 214, and monitor 220, like external devices of a personal computer, to input and output their daily business. Hence, there is no need to buy a personal computer to conduct daily business when a user owns the expansion module 210 of the present invention and the personal digital assistant 200.

Because the expansion module 210 of the present invention possesses the standard input/output device, the personal digital assistant 200 inserted in the expansion module 210 of the present invention needs to install only one driver for the expansion module 210 so that the personal digital assistant 200 can be operated more easily and practically. Furthermore, the expansion module 210 of the present invention uses only one connecting interface to couple with the personal digital assistant 200, and then the personal digital assistant 200 can work with different external devices by way of the expansion module 210. Therefore, the input/output burden of the personal digital assistant 200 can be reduced. The expansion module of the present invention further comprises a processor to transfer input/output data specification within the external devices, the personal digital assistant, and input/output interface.

The expansion module according to the present invention enhances the operation ability and practicability of the personal digital assistant and integrates the external devices and drivers thereof to increase the expansion ability. Therefore, the expansion module according to the present invention can provide a hot-swappable function so as to be used more widely. As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A personal digital assistant expansion module for a personal digital assistant comprising:
   a connecting interface coupling with the personal digital assistant to transmit signals between the personal digital assistant expansion module and the personal digital assistant;
   a network connection device coupling with the connecting interface to provide a network environment for the personal digital assistant;
   a storage device coupling with the connecting interface to storage and provide data for the personal digital assistant;
   a power module coupling with the connecting interface to provide an external electrical power to the personal digital assistant expansion module and the personal digital assistant, and recharge a battery of the personal digital assistant; and
   an input/output interface coupling with the connecting interface to connect with an external device for the personal digital assistant.

2. The personal digital assistant expansion module of claim 1, wherein the storage device comprises a hard disc.

3. The personal digital assistant expansion module of claim 2, wherein the external device is a monitor, a keyboard, a mouse, a hard disc, an optical disc drive or a printer.

4. The personal digital assistant expansion module of claim 1, wherein the connecting interface further comprises a processor to transfer data specifications within the personal digital assistant expansion module, the personal digital assistant and the input/output interface.

5. The personal digital assistant expansion module of claim 1, wherein the input/output interface is a universal serial bus (USB) interface.

6. The personal digital assistant expansion module of claim 1, wherein the input/output interface is a personal system/2 (PS/2) interface.

7. The personal digital assistant expansion module of claim 1, wherein the input/output interface is a blue tooth interface.

8. The personal digital assistant expansion module of claim 1, wherein the input/output interface is an interface obeying IEEE 1394 specifications.

9. The personal digital assistant expansion module of claim 1, wherein the input/output interface is an interface obeying IEEE 802.11x specifications.

10. The personal digital assistant expansion module of claim 1, wherein the input/output interface is an infrared (IR) interface.

11. The personal digital assistant expansion module of claim 1, wherein the external device is a monitor, a keyboard, a mouse, a hard disc, an optical disc drive, a plotter, a printer or a combination thereof.

12. A personal digital assistant expansion module for a personal digital assistant comprising:

a connecting interface coupling with the personal digital assistant to transmit signals between the personal digital assistant expansion module and the personal digital assistant;

a processor coupling with the connecting interface to control the personal digital assistant expansion module and transform input/output datas;

a network connection device coupling with the processor to provide a network environment for the personal digital assistant;

a storage device coupling with the processor to storage and provide data for the personal digital assistant;

a power module coupling with the processor to provide an external electrical power to the personal digital assistant expansion module and the personal digital assistant, and recharge a battery of the personal digital assistant;

an input/output interface coupling with the processor to connect with an external device for the personal digital assistant;

a monitor coupling with the processor to display working statuses of the personal digital assistant;

a keyboard coupling with the processor to input the data for the personal digital assistant; and a mouse coupling with the processor to control cursor positions of the personal digital assistant and choose icons on the monitor.

13. The personal digital assistant expansion module of claim 12, wherein the storage device comprises a hard disc.

14. The personal digital assistant expansion module of claim 13, wherein a storage capacity of the hard disc is larger than a storage capacity of the personal digital assistant.

15. The personal digital assistant expansion module of claim 12, wherein the input/output interface is a universal serial bus (USB) interface.

16. The personal digital assistant expansion module of claim 12, wherein the input/output interface is a personal system/2 (PS/2) interface.

17. The personal digital assistant expansion module of claim 12, wherein the input/output interface is a blue tooth interface.

18. The personal digital assistant expansion module of claim 12, wherein the input/output interface is an interface obeying IEEE 1394 specifications.

19. The personal digital assistant expansion module of claim 12, wherein the input/output interface is an interface obeying IEEE 802.11x specifications.

20. The personal digital assistant expansion module of claim 12, wherein the input/output interface is an infrared (IR) interface.

* * * * *